United States Patent [19]

Johnson et al.

[11] Patent Number: 5,249,834
[45] Date of Patent: Oct. 5, 1993

[54] APPARATUS FOR CONNECTING A POLYMERIC COMPOSITE PICKUP TRUCK CARGO BOX TO A METALLIC VEHICLE FRAME

[75] Inventors: Roger E. Johnson, Utica; Thomas C. Jensen, Clarkson; Edward C. Van Rossen, Roseville, all of Mich.

[73] Assignee: General Motors Corporation, Detroit, Mich.

[21] Appl. No.: 947,616

[22] Filed: Sep. 21, 1992

[51] Int. Cl.⁵ ............................................. D62D 23/00
[52] U.S. Cl. ..................................... 296/35.1; 411/103
[58] Field of Search ................... 296/35.1, 39.2, 901; 411/103

[56] References Cited

U.S. PATENT DOCUMENTS

| | | | |
|---|---|---|---|
| 3,283,639 | 11/1966 | Holton | 411/437 |
| 3,352,195 | 11/1967 | Fisher | 411/15 |
| 3,922,770 | 12/1975 | Ladouceur | 29/445 |
| 3,990,737 | 11/1976 | Palmer | 296/35.1 |
| 4,573,733 | 3/1986 | Zaydel | 296/901 |
| 4,868,968 | 2/1989 | Dixon et al. | 296/35.1 |
| 4,906,152 | 3/1990 | Kurihara | 411/182 |
| 4,912,826 | 4/1990 | Dixon et al. | 29/281.1 |
| 4,952,107 | 8/1990 | Dupree | 411/103 |

*Primary Examiner*—Robert R. Song
*Attorney, Agent, or Firm*—William A. Schuetz

[57] ABSTRACT

An apparatus for connecting a polymeric composite pickup truck cargo box to a metallic vehicle frame without damaging the polymeric composite material of the pickup truck cargo box. The connecting apparatus is a tapping plate which allows for the distribution of forces applied by a self-tapping fastener over a broad area of the pickup truck cargo box so as not to tear or puncture the polymeric composite material. The connecting apparatus also separates the polymeric composite pickup truck cargo box from the metallic vehicle frame so that the polymeric composite material does not degrade over time.

9 Claims, 3 Drawing Sheets

APPARATUS FOR CONNECTING A POLYMERIC COMPOSITE PICKUP TRUCK CARGO BOX TO A METALLIC VEHICLE FRAME

The present invention relates, in general, to a means for attaching a polymeric composite pickup truck cargo box to a vehicle and, more particularly, to the utilization of a connecting or tapping plate apparatus for connecting the polymeric composite pickup truck cargo box to a metallic frame of the vehicle without damaging the polymeric composite material of the pickup truck cargo box.

BACKGROUND OF THE INVENTION

The advancement and development of plastics has allowed for the design and production of a polymeric composite pickup truck cargo box. These pickup truck cargo boxes typically are comprised of a one-piece tub and a reinforced floor to which the one-piece tub is attached. The reinforced floor is typically fastened directly to a metallic frame of a vehicle. A conventional sheet metal fastener, by itself, cannot be utilized to attach the reinforced floor of the pickup truck cargo box to the vehicle's metallic frame, since the polymeric composite material cannot support a threaded fastener under the forces applied by the pickup truck cargo box. Due to the stiffness of the polymeric composite material, the load and the forces must be distributed over a broad area so as not to tear or puncture the reinforced floor of the pickup truck cargo box. Also, the polymeric composite pickup truck cargo box cannot be in direct contact with the metallic vehicle frame since prolonged contact will lead to the degradation of the polymeric composite material.

SUMMARY OF THE INVENTION

The present invention solves the above problem by providing a tapping plate that is adhered to or molded into the polymeric composite pickup truck cargo box. Commonly aligned holes are provided in the tapping plate and a metallic frame of a vehicle. A self-tapping fastener is utilized to connect the vehicle frame to the tapping plate through the commonly aligned holes, thereby connecting the pickup truck cargo box to the vehicle frame. The tapping plate provides a metallic receptacle by which the self-tapping fastener threads into so as to connect the pickup truck cargo box to the vehicle frame without having to thread a fastener into the polymeric composite material of the pickup truck cargo box. The tapping plate also provides a wide base so as to distribute the forces applied by the fastener over a broad area of the reinforced floor of the pickup truck cargo box so as to prevent any cracking or tearing of the polymeric composite material. An additional feature of the tapping plate is a pilot member that extends through the reinforced floor of the pickup truck cargo box and contacts the vehicle frame. The pilot member separates the pickup truck cargo box from the vehicle frame so as to prevent any degradation of the polymeric composite material caused by prolonged contact with the vehicle's metallic frame.

In the preferred form, the present invention provides a self-tapping connecting apparatus for connecting a polymeric composite pickup truck cargo box to a metallic vehicle frame without damaging the polymeric composite material of the pickup truck cargo box. A conventional polymeric composite pickup truck cargo box is provided and comprises a reinforced floor section and a tub section which is secured to the reinforced floor. A vehicle frame is also provided and has the reinforced floor of the pickup truck cargo box mounted directly to it. The self-tapping connecting apparatus comprises a tapping plate and a self-tapping fastener. The tapping plate is comprised of a rectangular base member and a cylindrical pilot member that is integral with and extends outward from the base member. The reinforced floor of the pickup truck cargo box has an opening through which the pilot member of the tapping plate extends to the vehicle frame. The base member of the tapping plate is adhered to the reinforced floor of the pickup truck cargo box through the use of a suitable or conventional adhesive. The pilot member contacts the vehicle frame and separates or spaces the reinforced floor of the pickup truck cargo box from the vehicle frame so that the reinforced floor is not in direct contact with the vehicle frame. Commonly aligned openings are provided in the vehicle frame, the reinforced floor of the pickup truck cargo box and the tapping plate, whereby a self-tapping fastener is inserted through the vehicle frame's opening and threaded into the tapping plate. The connecting apparatus of the present invention would be applied or used in a plurality of locations on the pickup truck cargo box so as to secure the pickup truck cargo box to the vehicle frame.

To this end, an object of the present invention is to provide a new and improved connecting apparatus for securing a polymeric composite pickup truck cargo box to a metallic vehicle frame without damaging the polymeric composite pickup truck cargo box. Another object is to provide a new and improved connecting apparatus for securing a polymeric composite pickup truck cargo box to a metallic vehicle frame while spacing the polymeric composite pickup truck cargo box from the metallic vehicle frame so as to prevent contact between the aforementioned members, and thus preventing degradation of the polymeric composite material of the pickup truck cargo box.

DESCRIPTION OF THE PREFERRED EMBODIMENTS

Figure 1:
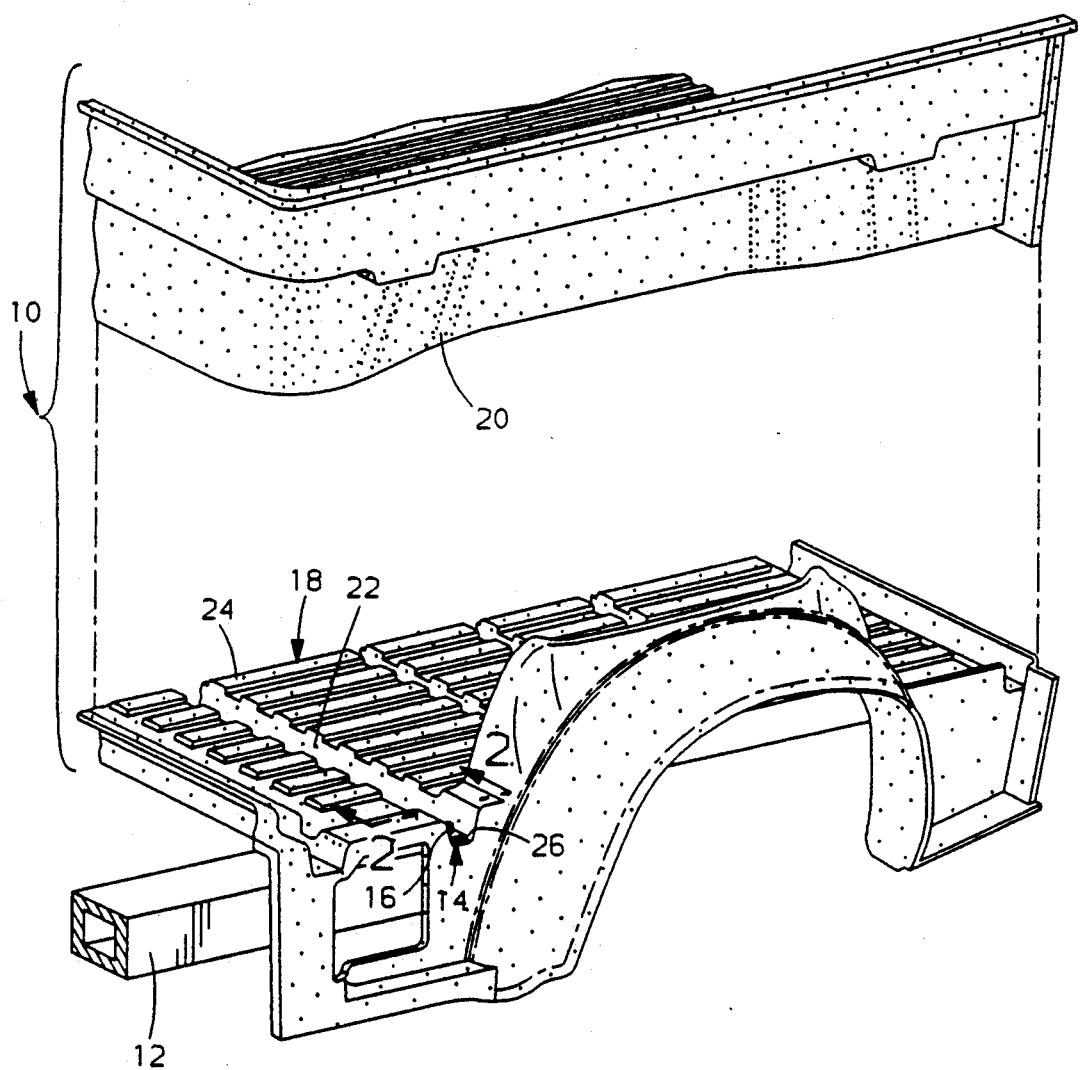
FIG. 1 is an exploded view with some parts cut-away showing a tub and reinforced floor of the polymeric composite pickup truck cargo box connected to a metallic vehicle frame by a tapping plate and self-tapping fastener as provided by the present invention.

Referring to the drawings, the present invention will now be described in detail with reference to the preferred embodiment.

FIG. 1 is an exploded view showing a polymeric composite pickup truck cargo box (10) secured to a conventional metallic frame (12) of a vehicle (not shown) through the use of a plurality of identical tapping plates -(14) and self-tapping fasteners (16) made according to the present invention. The pickup truck cargo box (10) is comprised of a reinforced floor (18) and a tub (20) which is secured to the reinforced floor (18). The reinforced floor (18) is secured to the vehicle frame (12) by the tapping plates (14) and the self-tapping fasteners (16). The reinforced floor (18) has or is provided with transversely extending steps or channels (22) at spaced longitudinal locations. The channels (22) extend downwardly from a top surface (24) of the reinforced floor (18) and terminate at a bottom (26) located adjacent to the vehicle frame (12). The tapping plates (14) are mounted at spaced locations on the bottom (26) of the channels (22) in the reinforced floor (18), and the self-tapping fasteners (16) are inserted through the vehicle frame (12) to provide the connecting means between the pickup truck cargo box (10) and the vehicle frame (12).

Figure 2:
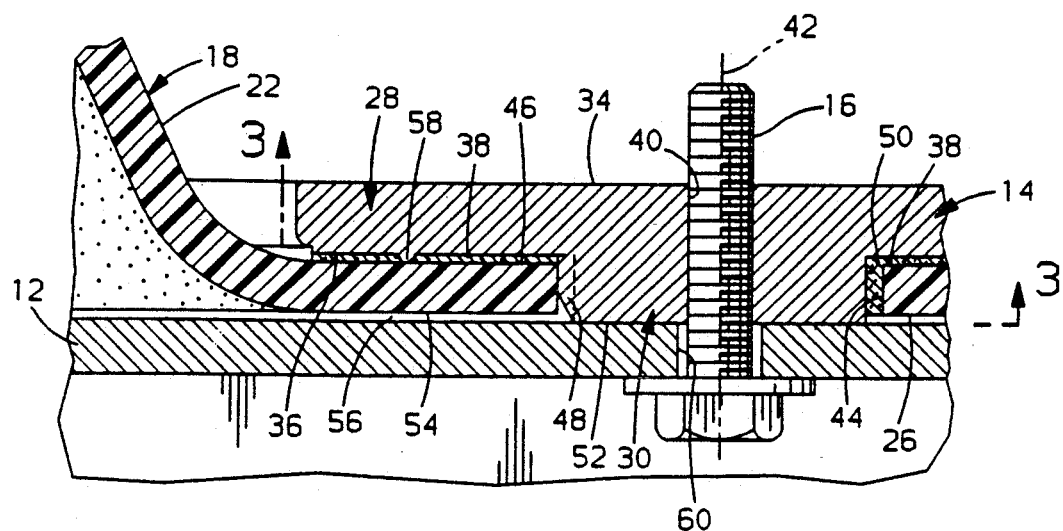
FIG. 2 is an enlarged sectional view taken at line 2—2 of FIG. 1 of the preferred embodiment and shows the tapping plate adhesively connected to the reinforced floor of the polymeric composite pickup truck cargo box.

FIG. 2 shows a sectional view of the preferred embodiment of the present invention. The tapping plate (14) is shown adhesively connected to the reinforced floor (18) of the polymeric composite pickup truck cargo box (10), and the tapping plate (14) is shown connected to the metallic vehicle frame (12) through the use of a self-tapping fastener (16). This provides one of the connections between the vehicle frame (12) and the pickup truck cargo box (10).

Figure 3:
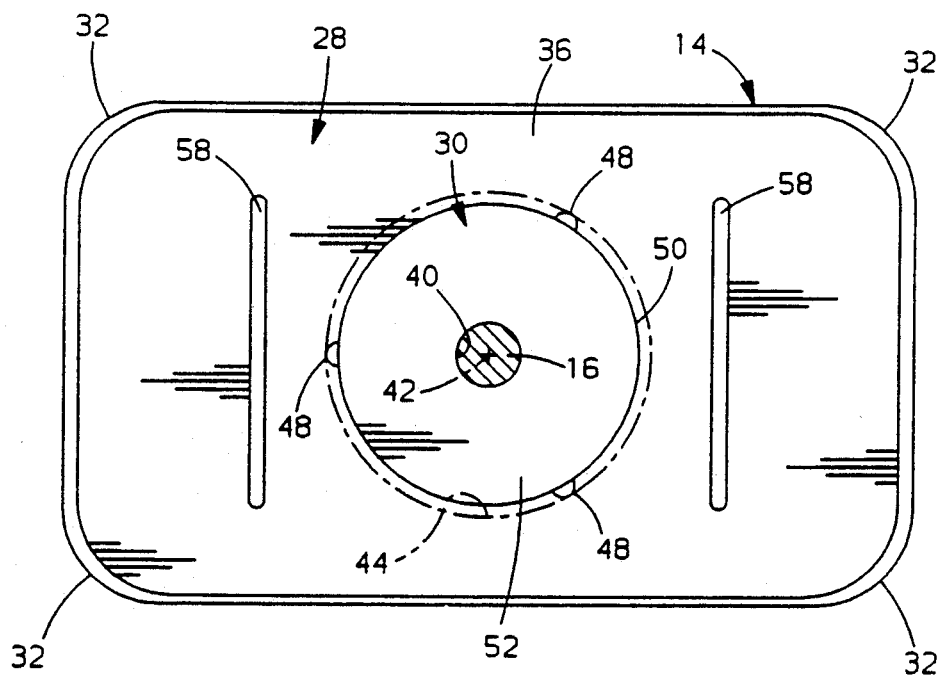
FIG. 3 is a sectional view taken at line 3—3 of FIG. 2 and shows the locating ribs and the adhesive standoffs of the tapping plate.

The tapping plate (14) is comprised of a base member (28) and a smaller pilot member (30). As seen in FIG. 3, the base member (28) is substantially rectangular with rounded corners (32), but the base member (28) may take on any shape that is required to cooperate with the shape or size of the pickup truck cargo box (10). As seen in FIG. 2, the base member (28) has a top surface (34) which is not in contact with the reinforced floor (18) of the pickup truck cargo box (10), and a bottom surface (36) that contacts the reinforced floor (18) of the pickup truck cargo box (10) through a conventional or suitable adhesive (38). The pilot member (30) is substantially cylindrical and extends from and is integral with the bottom surface (36) of the base member (28). Both the base member (28) and the pilot member (30) have a hole (40) passing through a common center-line axis (42). The tapping plate (14) is manufactured from a conventional sintered powdered metal construction to assure precise shapes required to fit the pickup truck cargo box (10). The powdered metal construction also provides better thread forming capabilities for the self-tapping fastener (16).

The pilot member (30) extends through an opening (44) in the bottom (26) of the channel of the reinforced floor (18) of the pickup truck cargo box (10) while the base member (28) contacts a top surface (46) of the bottom (26) of the channel (22) in the reinforced floor (18). As seen in FIG. 3, three equally spaced axially extending locating ribs (48) are provided on the outside diameter (50) of the pilot member (30). The locating ribs (48) are semicircular in shape with the radius of the semicircle having its origin on the outside diameter (50) of the pilot member (30) and swinging outwardly from the pilot member (30). As seen in FIG. 2, the radius of the locating ribs (48) is largest and constant from where the pilot member (30) meets the base member (28) to half-way down the cylindrical pilot member (30). The radius of the locating ribs (48) then begins to progressively decrease or taper inwardly extending from the half-way down point to the extending end or free end (52) of the pilot member (30) where the locating ribs (48) are reduced to the diameter (50) of the pilot member (30). The locating ribs (48) are designed to center the tapping plate (14) in the hole (44) provided in the reinforced floor (18) of the pickup truck cargo box (10). The extending end or free end (52) of the pilot member (30) has a diameter (50) that is slightly smaller than the diameter of the hole (44) provided in the bottom (26) of the channel (22) of the reinforced floor (18) of the pickup truck cargo box (10). The free end (52) of the pilot member (30) extends beyond the bottom surface (54) of the bottom (26) of the channel (22) of the reinforced floor (18) of the pickup truck cargo box (10) and engages the vehicle frame (12). By having the pilot member (30) contact the vehicle frame (12), a space (56) is created between the reinforced floor (18) and the vehicle frame (12) thereby preventing any direct contact between the polymeric composite pickup truck cargo box (10) and the vehicle frame (12). Maintaining the space (56) between the reinforced floor (18) and the vehicle frame (12) is critical since contact between these members may lead to degradation of the polymeric composite material of the pickup truck cargo box (10) over a prolonged period of time.

As seen in FIG. 2, the tapping plate (14) is attached to the reinforced floor (18) of the pickup truck cargo box (10) through the use of an adhesive (38). A pair of adhesive standoffs (58) are provided on the bottom surface (36) of the base member (28) of the tapping plate (14), as seen in FIGS. 2 and 3, to ensure retention of the adhesive (38). The adhesive standoffs (58) are substantially straight semicircular ribs that extend from and are integral with the base member (28). The pair of adhesive standoffs (58) are substantially parallel with one another and are on opposite sides of the the pilot member (30). The adhesive standoffs (58) contact the bottom (26) of the channels (22) of the reinforced floor (18) of the pickup truck cargo box (10) and provide a small gap between the base member (28) and the reinforced floor (18) of the pickup truck cargo box (10). This small gap allows for the flow and retention of adhesive (38), so that when adhesive (38) is applied between the base member (28) and the reinforced floor (18) of the pickup truck cargo box (10), the adhesive (38) will not be forced to flow out due to the flat surfaces of the base member (28) and the reinforced floor (18) of the pickup truck cargo box (10) being forced together by the fastening force of the self-tapping fastener (16). The tapping plate (14) is coated with an electrophoretic primer to provide for better adhesion to the adhesive (38).

As seen in FIG. 2, a self-tapping fastener (16) is utilized to connect the vehicle frame (12) and the reinforced floor (18) of the pickup truck cargo box (10). A hole (60) is provided in the vehicle frame (12) whereby the self-tapping fastener (16) passes through, but does not thread into the vehicle frame (12), as the self-tapping fastener (16) is slightly smaller in diameter than the hole (60) provided in the vehicle frame (12). The self-tapping fastener (16) threads into the hole (40) provided in the pilot member (30) and the base member (28) of the tapping plate (14). The self-tapping fastener (16) is driven into the tapping plate (14) until the reinforced floor (18) of the pickup truck cargo box (10) is secured to the vehicle frame (12). The width of the base member (28) of the tapping plate (14) aids in distributing the forces of the self-tapping fastener (16) over a wide area of the reinforced floor (18) of the pickup truck cargo box (10), thus ensuring that the self-tapping fastener (16) does not rip or tear the polymeric composite material of the pickup truck cargo box (10). The use of a self-tapping fastener (16) avoids the problem of cross-threading holes during final assembly.

Figure 4:
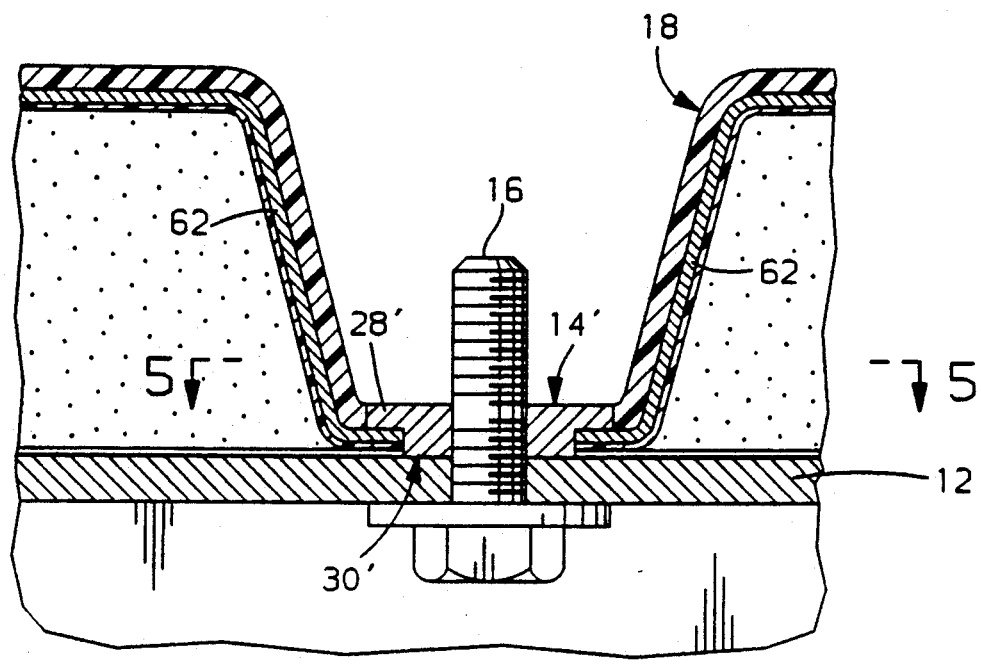
FIG. 4 is a sectional view of another embodiment of the invention whereby the tapping plate and sheet metal extensions are molded into the reinforced floor of the polymeric composite pickup truck cargo box.
Figure 5:
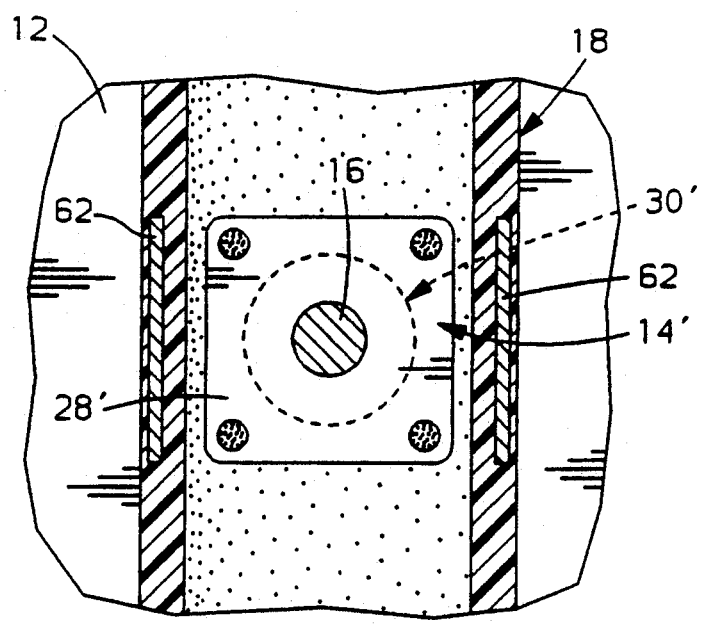
FIG. 5 is a sectional view taken at line 5—5 of FIG. 4 and shows the sheet metal extensions molded into the reinforced floor of the polymeric composite pickup truck cargo box.

FIGS. 4 and 5 show another embodiment of the present invention whereby the tapping plate (14') is molded into the reinforced floor (18) of the polymeric composite pickup truck cargo box (10). The pickup truck cargo box (10), vehicle frame (12) and self-tapping fastener (16) remain unchanged from the preferred embodiment. Added are a pair of sheet metal extensions (62) welded to the base member (28') of the tapping plate (14'). The ends of the sheet metal extensions are welded to the bottom surface of the base member (28') of the tapping plate (14) and extend outwardly from the tapping plate (14). The sheet metal extensions (62) follow the contour of the channels (22) of the reinforced floor (18) which has a U-shaped cross-section and aids in distributing the forces applied by the self-tapping fastener (16) over a broad area of the reinforced floor (18). The sheet metal extensions (62) may take on any contour that the reinforced floor (18) assumes. By spreading the fastener loads over a large area of the reinforced floor (18), internal stress is reduced in the polymeric composite material of the pickup truck cargo box (10) thus reducing the chances of damaging the polymeric composite material. The sheet metal extensions (62) and the tapping plate (14') are molded into the reinforced floor (18) when the pickup truck cargo box (10) is initially manufactured. The pilot member (30') of the tapping plate (14') still extends through the reinforced floor (18) so as to separate the reinforced floor (18) from the vehicle frame (12). The embodiment utilizing the molding method of connecting the tapping plate (14') to the reinforced floor (18) of the pickup truck cargo box (10) is not limited to a tapping plate (14') that includes sheet metal extensions (62). The embodiment may also include a tapping plate (14') without sheet metal extensions (62) as provided for in the preferred embodiment.

The foregoing description is of a preferred embodiment of the invention, and it will be understood by those of ordinary skill in the art that various modifications and changes may be made without departing from the scope of the invention as defined in the claims.

The embodiments of the invention in which an exclusive property or privilege is claimed are defined as follows:

1. An apparatus for connecting a polymeric composite pickup truck cargo box to a vehicle's metallic frame comprising:
    said polymeric composite pickup truck cargo box having an opening and a top surface and a bottom surface;
    said vehicle's metallic frame having an opening;
    a tapping plate separating said polymeric composite pickup truck cargo box from said vehicle's metallic frame and having a base member and a pilot member having an opening extending through said base member and said pilot member;
    said pilot member integral with and extending away from said base member and extending through said opening of said polymeric composite pickup truck cargo box beyond said bottom surface of said polymeric composite pickup truck cargo box and contacting said vehicle's metallic frame;
    said base member extending over and substantially parallel with said top surface of said polymeric composite pickup truck cargo box;
    a means for connecting said tapping plate to said polymeric composite pickup truck cargo box; and
    a self-tapping fastener extending through said vehicle's metallic frame and threading into said tapping plate for connecting said polymeric composite pickup truck cargo box to said vehicle's metallic frame through said tapping plate.

2. An apparatus for connecting a polymeric composite pickup truck cargo box to a vehicle's metallic frame as stated in claim 1 wherein said base member of said tapping plate comprises:
    a substantially rectangular plate integral with said pilot member; and
    a fastener load distributor connected to and extending outward from said base member and following the contour of said top surface of said polymeric composite pickup truck cargo box thereby distributing the force applied by said tapping plate and said self-tapping fastener.

3. An apparatus for connecting a polymeric composite pickup truck cargo box to a vehicle's metallic frame as stated in claim 1 wherein said means for connecting said tapping plate to said polymeric composite pickup truck cargo box comprises molding said tapping plate into said polymeric composite pickup truck cargo box.

4. An apparatus for connecting a composite pickup truck cargo box to a vehicle's metallic frame as stated in claim 1 wherein said means for connecting said tapping plate to said polymeric composite pickup truck cargo box comprises:
    said base member of said tapping plate having a bottom side;
    a plurality of ribs integral with and extending from said bottom side of said base member and being in contact with said top surface of said polymeric composite pickup truck cargo box; and
    an adhesive applied between said bottom side of said base member and said top surface of said polymeric composite pickup truck cargo box.

5. An apparatus for connecting a polymeric composite pickup truck cargo box to a vehicle's metallic frame as stated in claim I wherein said tapping plate comprises a sintered powdered metal.

6. An apparatus for connecting a polymeric composite pickup truck cargo box to a vehicle's metallic frame comprising:
    said vehicle's metallic frame having a substantially circular opening through said vehicle's metallic frame and said substantially circular opening having a center-line axis;
    said polymeric composite pickup truck cargo box having a bottom surface and a top surface and having a substantially circular opening having the same said center-line axis as said substantially circular opening in said vehicle's metallic frame;
    a tapping plate separating said polymeric composite pickup truck cargo box from said vehicle's metallic frame and having a substantially rectangular base member having a bottom side and a substantially cylindrical pilot member having a free end and being integral with and substantially perpendicular to said base member;

a plurality of locating ribs integral with said pilot member and flaring outward from said free end of said pilot member toward said base member;

said pilot member extending through said substantially circular opening in said polymeric composite pickup truck cargo box until said plurality of locating ribs contact said portion of said polymeric composite pickup truck cargo box that forms said substantially circular opening and having said pilot member extend beyond said bottom surface of said polymeric composite pickup truck cargo box contacting said vehicle's metallic frame;

a pair of adhesive standoffs integral with and extending outward from said bottom side of said base member and being substantially parallel and on opposite sides of said pilot member and having said pair of adhesive standoffs in contact with said top surface of said polymeric composite pickup truck cargo box;

said tapping plate having an outside layer of an electrophoretic primer;

an adhesive applied between said base member and said polymeric composite pickup truck cargo box;

said tapping plate having a substantially cylindrical opening extending through said base member and said pilot member and having the same said center-line axis as said substantially circular opening in said vehicle's metallic frame and said polymeric composite pickup truck cargo box; and a self-tapping bolt inserted through said opening in said vehicle's metallic frame and threaded into said tapping plate and connecting said polymeric composite pickup truck cargo box to said vehicle's metallic frame through said tapping plate.

7. An apparatus for connecting a polymeric composite pickup truck cargo box to a vehicle's metallic frame as stated in claim 6 wherein said tapping plate comprises a sintered powdered metal.

8. An apparatus for connecting a polymeric composite pickup truck cargo box to a vehicle's metallic frame comprising:

said vehicle's metallic frame having a substantially circular opening through said vehicle's metallic frame and said substantially circular opening having a center-line axis;

said polymeric composite pickup truck cargo box having a substantially circular opening having the same said center-line axis as said substantially circular opening in said vehicle's metallic frame;

a tapping plate having a substantially rectangular base member and a substantially cylindrical pilot member being integral with and substantially perpendicular from said base member;

said pilot member extending through said substantially circular opening in said polymeric composite pickup truck cargo box and beyond said bottom surface of said polymeric composite pickup truck cargo box contacting said vehicle's metallic frame;

a pair of sheet metal extensions welded to said base member and extending outward following and contacting the contour of said polymeric composite pickup truck cargo box adjacent so said base member;

a means for molding said tapping plate and said pair of sheet metal extensions integral with said polymeric composite pickup truck cargo box;

said tapping plate having a substantially cylindrical opening extending through said base member and said pilot member and having the same said center-line axis of said substantially circular opening in said vehicle's metallic frame and said polymeric composite pickup truck cargo box; and a self-tapping bolt inserted through said opening in said vehicle's metallic frame and threaded into said tapping plate connecting said polymeric composite pickup truck cargo box to said vehicle's metallic frame through said tapping plate.

9. An apparatus for connecting a composite pickup truck cargo box to a vehicle's metallic frame as stated in claim 8 wherein said tapping plate comprises a sintered powdered metal.

* * * * *